United States Patent [19]

Ueno et al.

[11] Patent Number: 5,036,127
[45] Date of Patent: Jul. 30, 1991

[54] FIBER-REINFORCED THERMOPLASTIC RESIN COMPOSITION

[75] Inventors: Kouhei Ueno; Kazuyoshi Tanaka, both of Osaka, Japan

[73] Assignee: UBE Industries, Ltd., Yamaguchi, Japan

[21] Appl. No.: 530,820

[22] Filed: May 30, 1990

[30] Foreign Application Priority Data

May 30, 1989 [JP] Japan .................................. 1-134776

[51] Int. Cl.$^5$ ................................................ C08K 3/30
[52] U.S. Cl. .................................. 524/423; 524/432; 524/433
[58] Field of Search ..................... 524/423, 432, 433

[56] References Cited

U.S. PATENT DOCUMENTS 3,835,088  9/1974  Takamiya et al. .................. 524/433

FOREIGN PATENT DOCUMENTS 61-072038  4/1986  Japan .

Primary Examiner—Paul R. Michl
Assistant Examiner—John J. Guarriello
Attorney, Agent, or Firm—McAulay Fisher Nissen Goldberg & Kiel

[57] ABSTRACT

A fiber-reinforced thermoplastic resin composition comprises a composition of a thermoplastic resin in an amount of 50 to 99% by weight and a fibrous magnesium oxysulfate in an amount of 1 to 50% by weight, and magnesium oxide and/or zinc oxide in an amount of 0.01 to 30 parts by weight per 100 parts by weight of the fibrous magnesium oxysulfate.

10 Claims, No Drawings

FIBER-REINFORCED THERMOPLASTIC RESIN COMPOSITION

BACKGROUND OF THE INVENTION

1. Field of the invention

The present invention relates to a stabilized thermoplastic resin composition which is reinforced with fibrous magnesium oxysulfate (abbreviated to MOS hereinafter).

2. Description of prior art

It is well known to incorporate inorganic materials into thermoplastic resins for the purpose of improving various properties of the thermoplastic resins, such as rigidity, mechanical strength, heat resistance, molding shrinkage and dimensional stability. Examples of the inorganic materials employable for that purpose include particulate substances such as calcium carbonate, barium sulfate and magnesium hydroxide; plate-shaped or flake-shaped substances such as talc and mica; and fibrous substances such as glass fiber and asbestos. The particulate substances, among these inorganic materials, hardly give high reinforcing effect to the thermoplastic resins, so that the thermoplastic resin molds obtained by adding the particulate substances to the resins cannot be always employed for industrial materials requiring high characteristics. On the other hand, the plate-shaped or flake-shaped substances and the fibrous substances show high reinforcing effect in one or two-dimensional directions, so that these substances are widely used as reinforcements for thermoplastic resins. However, since the above-mentioned reinforcements showing high reinforcing effect also have various drawbacks, they are sometimes restricted in the use thereof depending on the purpose. For example, products obtained by molding the thermoplastic resins containing the plate-shaped or flake-shaped substances, are apt to have flow marks occurring in the molding procedure and generally show lower-rigidity as compared with molded products obtained from the thermoplastic resins containing fibrous substances such as fiber glass. On the other hand, the thermoplastic resins containing fibrous substances are molded to show poor elongation and to likely have silver streaks on the surfaces of the molded products. Further, the surfaces of the molded products mostly exhibit low glossiness. Particularly in the case of using a glass fiber, the resulting molded product shows low resistance to falling ball impact. Accordingly, in the use of the above-mentioned conventional reinforcements, it is necessary to make an appropriate selection according to the purpose.

The above-mentioned various drawbacks can be removed to a certain extent by appropriately selecting or modifying base materials, subjecting inorganic materials to be used as the reinforcements to surface treatment, adding other appropriate additives, adjusting molding and processing conditions, etc., but satisfactory removal of the drawback can be hardly obtained.

As a thermoplastic resin composition which is improved in various drawbacks found in conventional thermoplastic resin compositions containing the above-mentioned reinforcements, a fiber-reinforced thermoplastic resin composition comprising a thermoplastic resin and fibrous magnesium oxysulfate (MOS) have been proposed. A composition comprising polypropylene and MOS is, for example, disclosed in Japanese Patent Provisional Publication No. 57(1982) 109846, and a kneaded composition of a thermoplastic resin and MOS is disclosed in Japanese Patent Provisional Publication No. 59(1984) 172533.

MOS releases water of crystallization at approx. 250° C., whereby a surface of the resulting molded product becomes unstable likely to show silver streaks. A composition improved in this point is disclosed in Japanese Patent Provisional Publication No. 61(1986).72038, and this composition comprises polypropylene, MOS and calcium oxide. However, calcium oxide needs to be handled or stored very carefully, because it rapidly reacts with water and is unstable in air.

SUMMARY OF THE INVENTION

The present inventors have studied to obtain a fiber-reinforced thermoplastic resin composition comprising a thermoplastic resin and fibrous magnesium oxysulfate (MOS), which is free from the above-mentioned drawback on the handling procedure found in conventional compositions comprising a thermoplastic resin and MOS and is stable in the molding stage (in a high temperature). As a result, it has been discovered that the composition satisfying the above characteristics can be obtained by adding a specific additive (i,e,. magnesium oxide and/or zinc oxide) to the composition comprising a thermoplastic resin and MOS.

It is an object of the present invention to provide a thermoplastic resin composition which is improved in various drawbacks found in conventional thermoplastic resin compositions containing the above-mentioned reinforcements.

It is another object of the invention to provide a thermoplastic resin composition which is enhanced in rigidity, mechanical strength, heat resistance, etc.

It is a further object of the invention to provide a fiber-reinforced thermoplastic resin composition comprising a thermoplastic resin and fibrous magnesium oxysulfate (MOS), which is almost free from the above-mentioned drawback on the handling procedure found in conventional compositions comprising a thermoplastic resin and MOS and is stable in the molding stage (at a high temperature).

There is provided by the present invention a fiber-reinforced thermoplastic resin composition comprising a composition of (a) a thermoplastic resin in an amount of 50 to 99% by weight, and (b) fibrous magnesium oxysulfate in an amount of 1 to 50% by weight, and magnesium oxide and/or zinc oxide in an amount of 0.01 to 30 parts by weight per 100 parts by weight of the fibrous magnesium oxysulfate.

The fiber-reinforced thermoplastic resin composition of the invention containing MOS is excellent in stability in the molding procedure, particularly excellent in moldability at high temperatures. Further, the additive can be easily handled in industrial production.

The composition of the present invention contains magnesium oxide or zinc oxide in addition to the composition of a thermoplastic resin and MOS, whereby a surface of the molded product becomes stable, so that silver streaks hardly occur on their surfaces. That is, in the case that the composition containing neither magnesium oxide nor zinc oxide the oxide is molded at a high temperature (e.g., at 260° C.), MOS in the composition releases water of crystallization to easily generate silver streaks on the molded product. However, the composition containing magnesiun oxide and/or zinc oxide according to the invention is molded with no production of silver streaks, because these oxides trap water of crystallization released by MOS in the molding procedure (at a high temperature). Further, the magnesium oxide or zinc oxide is stable under high humidity compared as calcium oxide, so that the resin composition of the invention is excellent in workability (handling Properties) and storage stability.

DETAILED DESCRIPTION OF THE INVENTION

There is no specific limitation on the thermoplastic resins employable in the invention, provided that the temperatures required for processing the resins are 270° C. or lower. Examples of the thermoplastic resins employable in the invention include crystalline polypropylene, polyethylene, vinyl chloride resin, polystyrene resin, ABS resin, nylon 6, nylon 12, acrylic resin, copolymers such as ethylene-propylene copolymer, and elastomers such as styrene elastomers (e.g., styrene-ethylene-butadiene-styrene rubber (SEBS), styrene-butadiene-styrene rubber (SBS), styrene-isoprene-styrene rubber (SIS) and styrene-butadiene rubber (SB)), olefin elastomers (e.g., ethylene propylene rubber and ethylene propylene diene rubber), polyamide elastomers, polyester elastomers and polyurethane elastomers. Mixtures of these resins can be also employed.

In the invention, modified thermoplastic resins can be also employed. For modification of the thermoplastic resin, various modifiers such as silane-type modifiers and unsaturated acid modifiers can be employed. In the case of using an unsaturated compound as the modifier, the thermoplastic resin can be modified by further adding peroxide, or only adding the unsaturated compound. In the case of using a modifier not having an unsaturated group, the thermoplastic resin can be modified by only adding the modifier.

Examples of the silane-type modifiers (i.e., silane coupling agents) include vinyltriethoxysilane, vinyltrimethoxysilane, vinyltrichlorosilane, vinyldichloroethysilane, vinylchlorodiethylsilane, vinyltris($\beta$-methoxyethoxysilane), $\gamma$-glycidoxypropyltrimethoxysilane, $\gamma$-aminopropyltriethoxysilane, $\gamma$-methacryloxypropylmethoxysilane, N-$\beta$-(aminoethyl)-$\gamma$-aminopropyltriethoxysilane, and N-$\beta$(aminoethyl)- $\gamma$-aminopropylmethyldiethoxysilane.

Examples of the unsaturated acid modifiers include unsaturated carboxylic acids and derivatives thereof such as metal salts. Examples of the unsaturated carboxylic acids employable for the modification include acrylic acid, methacrylic acid, maleic acid, fumaric acid, itaconic acid, crotonic acid, citraconic acid, sorbic acid, mesaconic acid and angelic acid. Examples of the unsaturated carboxylic acid derivatives include acid anhydrides, esters, amides, imides and metal salts, and in more detail, there can be mentioned maleic anhydride, itaconic anhydride, citraconic anhydride, methyl acrylate, methyl methacrylate, ethyl acrylate, butyl acrylate, monoethyl maleate, acrylamide, monoamide maleate, maleimide, N-butyl maleimide, sodium acrylate and sodium methacrylate.

The above-mentioned modifiers are preferably used in an amount of 0.005 to 3 parts by weight per 100 parts by weight of the thermoplastic resin contained in the composition. If the amount of the modifier is less than 0.005 part by weight, the strength of a molded product obtained from the thermoplastic resin composition is hardly enhanced. On the contrary, if the amount thereof exceeds 3 parts by weight, the strength of the mold reaches the upper limit and any further increase of the strength cannot be expected, so that, in the case of employing the aforementioned silane coupling agent as the modifier, the use of the coupling agent in an amount of more than 3 parts by weight is particularly disadvantageous from the viewpoint of cost.

In the present invention, the thermoplastic resin is used in an amount of 50 to 99 % by weight, preferably 60 to 97 % by weight, in a composition of the resin and MOS.

The fibrous magnesium oxysulfate (MOS) employable in the invention is a synthetic substance which can be represented by chemical formula of $MgSO_4.5MgO.8H_2O$ or $MgSO_4.5Mg(OH)_2.3H_2O$. The fibrous MOS can be prepared by dispersing magnesium oxide or magnesium hydroxide into an aqueous solution of magnesium sulfate to allow the dispersing solution to react under heating, or by dispersing magnesium hydroxide into a sulfuric acid solution to allow the dispersing solution to react under heating. An example of the process for the preparation is described later. Other preparation processes or properties of the resulting products are described in detail on the specification of Patent Application No. 55.52364 Further, the fibrous MOS of the invention is a fibrous material of a needle crystalline structure having a true specific gravity of 2.0 to 2.5, a length (fiber length) of 10 to 100 $\mu$m, a diameter (fiber diameter) of 0.3 to 2 $\mu$m, and a ratio of fiber length to fiber diameter of 30 to 60. The amount of the fibrous MOS is generally in the range of 1 to 50 % by weight, preferably 3 to 40 % by weight, in the composition of the thermoplastic resin and MOS.

The magnesium oxide and zinc oxide employable in the invention are in the form of particles, and the particles preferably are small in particle diameter. Each mean particle diameter of the oxides is generally in the range of 0.1 to 80 $\mu$m, preferably 0.1 to 20 $\mu$m. If the diameter of the oxide is less than 0.1 $\mu$m, the effect of its addition may not be sufficiently obtained owing to ununiformity of dispersion of the oxide in the molded products of the composition. On the contrary, if the diameter exceeds 80 $\mu$m, the product of the composition sometimes may result in lowering of impact resistance. The magnesium oxide or the 5 zinc oxide is generally used in an amount of 0.01 to 30 parts by weight, preferably 0.2 to 25 parts by weight, per 100 parts by weight of MOS. If the amount of the oxide is less than 0.01 parts by weight, the effect of its addition is not sufficiently obtained. On the contrary, if the amount exceeds 30 parts by weight, the composition lowers in flowability. Further, the magnesium oxide or zinc oxide is lower in reactivity with water compared as calcium oxide, so that the magnesium oxide or zinc oxide is stable even under high humidity. Therefore, the composition containing the oxide of the invention is excellent in workability (handling properties) and storage stability.

The fiber-reinforced thermoplastic resin composition of the invention may contain other fillers, for example, calcium carbonate, talc, mica, barium sulfate, magnesium hydroxide, glass fiber and wollastonite. As for the amount of these fillers (reinforcing materials), it is unsuitable to use the fillers in not smaller than the same amount (weight) as that of MOS. Further, independent of the amount of the filler, MOS is required to be added in an amount of 1% by weight or more based on the whole amount of the composition of the thermoplastic resin and MOS, as mentioned hereinbefore.

In addition to the above-mentioned fillers and reinforcing materials, other fillers such as metal powders and fibrous materials (e.g., metal fiber and glass fiber) can be also used in combination.

The process for preparing the composition of the invention is generally carried out by mixing, optionally under melting, the above components using the known mixing machines such as a V-type blender, a single- or twin-screw extruder, a Banbury mixer, a continuous mixer and a roll. It is most practically preferred to mix through adding all components at the same time.

The components of the invention are preserved in a state of a mixture of a kneading mixture which is prepared by the processes as mentioned above. The mixture is provided to mold or process. In detail, the components of the invention is molded or processed by known methods such as injection molding, extrusion molding, blow molding, compression molding, vacuum forming, pressure forming, laminated molding, roll processing, stretching processing and stamping processing, whereby the molded product can be obtained.

The examples of the present invention and the comparison examples are given below.

Example of preparation of birous magnesium oxysulfate 246.5 g of magnesium sulfate heptahydrate ($MgSO_4.7H_2O$) were dissolved in 100 ml of water. Into the obtained solution, 10.3 g of magnesium oxide were dispersed. The dispersion was introduced into a 2-litter autoclave, allowing it to react for 7 hours at 170° C., whereby a precipitate is formed. The precipitate was taken out, washed with water, and dried at 125° C. to give fibrous magnesium oxysulfate (aspect ration: 20-50, fiber diameter: 0.3-2 μm).

EXAMPLE 1

80 parts by weight of a crystalline propylene-ethylene block copolymer (MI[ASTM D-1238]: 9 g/10 min., ethylene content: 7 wt.%), 20 parts by weight of fibrous magnesium oxysulfate (aspect ration: 20-50, fiber diameter: 0.3-2 μm) and 2 parts by weight of magnesium oxide (mean particle diameter: 0.4 μm, available from Asahi Glass Co., Ltd.) were well mixed with each other using V-type blender. The resulting mixture was then mixed under melting using a twin-screw extruder at a nozzle temperature of 210° C., to prepare pellets. The pellets were subjected to injection molding at temperatures of 220°, 240° and 260° C. (at the nozzle and cylinder portions) and a molding temperature of 60° C., to prepare test strips for appearance observation.

The results on the appearance observation of the test strips are set forth in Table 1.

EXAMPLE 2

The procedures of Example 1 were repeated except for using zinc oxide (mean particle diameter: 0.4 μm [distribution of particle diameter: 0.3–0.7 μm], available from Sakai Chemical Industries Ltd.) instead of magnesium oxide, to prepare test strips for appearance observation.

The results on the appearance observation of the test strips are set forth in Table 1.

COMPARISON EXAMPLE 1

The procedures of Example 1 were repeated except for not using magnesium oxide, to prepare test strips for appearance observation.

The results on the appearance observation of the test strips are set forth in Table 1.

EXAMPLE 3

The procedures of Example 1 were repeated except for using magnesium oxide having been allowed to stand for 72 hours at a humidity of 70 % instead of magnesium oxide, to prepare test strips for appearance observation.

The results on the appearance observation of the test strips are set forth in Table 1.

EXAMPLE 4

The procedures of Example 2 were repeated except for using zinc oxide having been allowed to stand for 72 hours at a humidity of 70 % instead of zinc oxide, to prepare test strips for appearance observation.

The results on the appearance observation of the test strips are set forth in Table 1.

COMPARISON EXAMPLE 2

The procedures of Example 3 were repeated except for using calcium oxide instead of magnesium oxide, to prepare test strips for appearance observation.

The results on the appearance observation of the test strips are set forth in Table 1.

EXAMPLE 5

The procedures of Example 1 were repeated except for using nylon 12 (trade name: 3014U, available from Ube Industries Ltd.) instead of polypropylene-ethylene block copolymer, to prepare test strips for appearance observation.

The results on the appearance observation of the test strips are set forth in Table 1.

COMPARISON EXAMPLE 3

The procedures of Example 5 were repeated except for not using magnesium oxide, to prepare test strips for appearance observation.

The results on the appearance observation of the test strips are set forth in Table 1.

TABLE 1

|  | Resin | | MOS | Additive | | Occurrence of Silver Streak | | |
| --- | --- | --- | --- | --- | --- | --- | --- | --- |
|  | Kind | Amount (wt. %) | Amount (wt. %) | Kind | Amount | 220° C. | 240° C. | 260° C. |
| Example 1 | PP | 80 | 20 | MgO | 3 | AA | AA | AA |
| Example 2 | PP | 80 | 20 | ZnO | 4 | AA | AA | BB |
| Com. Ex. 1 | PP | 80 | 20 | — | — | BB | BB | CC |
| Example 3 | PP | 80 | 20 | MgO | 3 | AA | AA | AA |
| Example 4 | PP | 80 | 20 | ZnO | 4 | AA | AA | BB |
| Com. Ex. 2 | PP | 80 | 20 | CaO | 3 | DD | DD | DD |
| Example 5 | N12 | 80 | 20 | ZnO | 4 | AA | AA | AA |

TABLE 1-continued

| | Resin | | MOS | Additive | | Occurrence of Silver Streak | | |
|---|---|---|---|---|---|---|---|---|
| | Kind | Amount (wt. %) | Amount (wt. %) | Kind | Amount | 220° C. | 240° C. | 260° C. |
| Com. Ex. 3 | N12 | 80 | 20 | — | — | BB | BB | CC |

Remark:
PP: Polypropylene ethylene block copolymer
N12: Nylon 12
AA: Any silver streak was not visually observed.
BB: A small number of silver streaks were visually observed.
CC: A large number of silver streaks were visually observed.
DD: A small amount of gel was formed (dispersibility was low), and some silver streaks were visually observed.

The amount of the additive is expressed based on parts by weight.

The test strips of Example 1 and 3 obtained by adding the magnesium oxide to the thermoplastic resin and MOS and the strips of Example 2 obtained by adding zinc oxide had hardly silver streaks on their surfaces. The test strips of Example 3 and 4 also had no silver streaks. On the other hand, the test strips of Comparison Example 1 and 3 with no use of the oxides had silver streaks. Further, in contrast to Example 3 and 4, the test strips of Comparison Example 2 using calcium oxide which has been allowed to stand at a humidity of 70 % showed gel and silver streaks.

We claim:

1. A fiber-reinforced thermoplastic resin composition comprising a composition of (a) a thermoplastic resin in an amount of 50 to 99% by weight and (b) fibrous magnesium oxysulfate in an amount of 1 to 50% by weight, and
   magnesium oxide in an amount of 0.01 to 30 parts by weight per 100 parts by weight of the fibrous magnesium oxysulfate.

2. The fiber-reinforced thermoplastic resin composition as claimed in claim 1, wherein the amount of said thermoplastic resin is in the range of 60 to 97% by weight and the amount of said fibrous magnesium oxysulfate is in the range of 3 to 40% by weight.

3. The fiber-reinforced thermoplastic resin composition as claimed in claim 1, wherein the magnesium oxide is in the form of particles having a mean particle diameter in the range of 0.1 to 80 μm.

4. The fiber-reinforced thermoplastic resin composition as claimed in claim 1, wherein the amount of said magnesium oxide is the range of 0.2 to 25 parts by weight per 100 parts by weight of the fibrous magnesium oxysulfate.

5. The fiber-reinforced thermoplastic resin composition as claimed in claim 1 wherein said thermoplastic resin is a crystalline propylene-ethylene block copolymer.

6. A fiber-reinforced thermoplastic resin composition comprising a composition of (a) a thermoplastic resin in an amount of 50 to 99% by weight and (b) fibrous magnesium oxysulfate in an amount of 1 to 50% by weight, and
   zinc oxide in an amount of 0.01 to 30 parts by weight per 100 parts by weight of the fibrous magnesium oxysulfate.

7. The fiber-reinforced thermoplastic resin composition as claimed in claim 6 wherein the amount of said thermoplastic resin is in the range of 60 to 97% by weight and the amount of said fibrous magnesium oxysulfate is in the range of 3 to 40% by weight.

8. The fiber-reinforced thermoplastic resin composition as claimed in claim 6 wherein the zinc oxide is in the form of particles having a mean particle diameter in the range of 0.1 to 80 μm.

9. The fiber-reinforced thermoplastic resin composition as claimed in claim 6 wherein the amount of said zinc oxide is in the range of 0.2 to 25 parts by weight per 100 parts by weight of the fibrous magnesium oxysulfate.

10. The fiber-reinforced thermoplastic resin composition as claimed in claim 6 wherein said thermoplastic resin is a crystalline propylene-ethylene block copolymer.

* * * * *